US010632622B2

(12) United States Patent
Hwang et al.

(10) Patent No.: US 10,632,622 B2
(45) Date of Patent: Apr. 28, 2020

(54) ERROR COMPENSATION DEVICE AND ERROR COMPENSATION METHOD

(71) Applicant: NATIONAL CHUNG SHAN INSTITUTE OF SCIENCE AND TECHNOLOGY, Taoyuan (TW)

(72) Inventors: Yi-Yuh Hwang, Taipei (TW); Wei-Guo Chang, Taoyuan (TW); Li-Chung Liu, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 243 days.

(21) Appl. No.: 15/854,896

(22) Filed: Dec. 27, 2017

(65) Prior Publication Data

US 2019/0193271 A1    Jun. 27, 2019

(51) Int. Cl.
*B25J 9/16* (2006.01)
(52) U.S. Cl.
CPC ............ *B25J 9/1697* (2013.01); *Y10S 901/09* (2013.01); *Y10S 901/47* (2013.01)
(58) Field of Classification Search
None
See application file for complete search history.

(56) References Cited

U.S. PATENT DOCUMENTS

2019/0071188 A1* 3/2019 Adarve Lozano ..... B64D 39/00
2019/0118963 A1* 4/2019 Lozano .................. B64D 39/00

* cited by examiner

*Primary Examiner* — Justin P. Misleh
(74) *Attorney, Agent, or Firm* — Schmeiser, Olsen & Watts, LLP

(57) ABSTRACT

An error compensation device includes at least one photographing module, a comparison module and a compensation module compensation module. The photographing module establish a space coordinate system relative to the object and comprises a first photographer and a second photographer which respectively photograph a first non-deformed laser speckle image on a first surface and a second non-deformed laser speckle image on a second surface, the first surface differs from the second surface by an azimuth. The comparison module respectively compares the first non-deformed laser speckle image before and after the displacement with the second non-deformed laser speckle image to calculate a displacement value between the two surfaces. The compensation module controls the movement of the object according to the displacement value. The error compensation utilizes the displacement of the non-deformed laser speckle image to obtain the absolute error of the object and compensate the error.

8 Claims, 5 Drawing Sheets

ERROR COMPENSATION DEVICE AND ERROR COMPENSATION METHOD

FIELD OF THE INVENTION

The present disclosure relates to an error compensation device, and in particular, to an error compensation device that can be applied to different cutting conditions by establishing a coefficient model in advance.

BACKGROUND OF THE INVENTION

Since the Third Industrial Revolution, mechanical arms and robots equipped with a programmable logic controller (PLC) have begun to occupy a pivotal position in the field of industrial production, especially the mechanical arm widely used in precision machining or the IT industry, so that the accuracy of positioning is crucial.

For the mechanical arms, the difficulties of positioning are to overcome various unavoidable errors. The errors can be roughly divided into two kinds: geometric error and non-geometric error. The geometric errors are, for example, the parameter errors of the links of the mechanical arm, the errors between the reference coordinate system and the actual space coordinate system or the parallelism errors of the axes of the joints of the mechanical arm. The most significant non-geometric error is thermal error, followed by backlash error caused by a combination of gears or deformation error of joints and links caused by stress or weight of self-body.

Since the above errors are comprehensively presented on the mechanical arm, it is difficult to establish error compensation models corresponding to various error factors one by one. Even if the error compensation models are established, the individual components of the mechanical arm exist individual errors or different errors caused by component assembly. Therefore, error compensation models are not always adapted to mechanical arms, which make the error compensation work extremely difficult.

SUMMARY OF THE INVENTION

The present disclosure provides an error compensation device and a method for error compensation. An absolute error is defined by displacement value of the non-deformed laser speckle on the surface of the object, and compensation work is performed according to the absolute error.

According to an embodiment of the present disclosure, an error compensation device for detecting and compensating a displacement error of an object comprises at least one photographing module, a comparison module and a compensation module. The photographing module establishes a space coordinate system relative to the object and comprises a first photographer and a second photographer. The first photographer corresponds to a first surface of the object and captures a plurality of first non-deformed laser speckle images on the first surface, and the second photographer corresponds to a second surface of the object and captures a plurality of second non-deformed laser speckle images on the second surface, wherein the first surface differs from the second surface by an azimuth. The comparison module compares two of the first non-deformed laser speckle images and two of the second non-deformed laser speckle images respectively before and after displacement of the object and calculates displacement values of the first surface and the second surface in the space coordinate system. The compensation module is coupled to the object and receives the displacement values of the first surface and the second surface from the comparison module and controls the object movement according to the displacement values.

Therefore, in this embodiment, the moving distance and the direction of any point on the surface of the object can be obtained by comparing the non-deformed laser speckle images photographed before and after the displacement of the object. In addition, since the displacement value of the non-deformed laser speckle is already a comprehensive performance result of all the errors, it is no longer necessary to establish a compensation model respectively for various error factors. The embodiment of the present disclosure has a faster and more accurate error compensation effect.

In an embodiment, the space coordinate system is a Cartesian coordinate system or a cylindrical coordinate system.

In an embodiment, a unit of the displacement value is length or angle.

In an embodiment, the azimuth is 90 degrees.

In an embodiment, the object is arranged on a mechanical arm.

In an embodiment, a material of the object is invar, super invar or zero thermal expansion glass-ceramics.

In an embodiment, each of the displacement values of the first surface and the second surface is calculated by Sum of Absolute Differences (SAD), Sum of Squared Differences (SSD), Speeded Up Robust Features (SURF), Scale Invariant Feature Transform (SIFT) or Normalized Cross Correlation (NCC).

In an embodiment, a number of the photographing module is two, and two of the photographing modules are arranged on both sides of the object.

With the above embodiments, the present disclosure can be applied to the error compensation operation of a Cartesian coordinate system or a cylindrical coordinate system, and since the two photographers photographed at different azimuths, the displacements in all directions of the object in three-dimensional space can be precisely calculated. In addition, the use of invar, super invar or zero-expansion glass can make the error compensation device maintain the calibration state and avoid the problem that the non-deformed laser speckle images captured by the photographing module do not correspond to the actual positions due to the displacement of the photographing module.

According to another embodiment of the present disclosure, there is provided an error compensation method, which includes the following steps: providing at least one photographing module comprising a first photographer and a second photographer; establishing a space coordinate system of the photographing module relative to the object; operating the first photographer to photograph a plurality of first non-deformed laser speckle images on a first surface of the object; operating the second photographer to photograph a plurality of second non-deformed laser speckle images on a second surface of the object; wherein the first surface and the second surface relative the object differ by an azimuth; comparing the two first non-deformed laser speckle images of the first surface and the two second non-deformed laser speckle images of the second surface before and after a displacement of the object respectively; calculating displacement values of the first surface and the second surface respectively in the space coordinate system according to two of the first non-deformed laser speckle images and two of the second non-deformed laser speckle images; moving the object according to the displacement values.

Through the error compensation method, the present disclosure captures the non-deformed laser speckle images through the photographer and then compares the non-deformed laser speckle images captured before and after the displacement of the object to quickly find the amount of movement of the object on any surface or position and directly applied to the error compensation. Therefore, the error compensation method used in the present embodiment does not need to correct each error factor one by one, but calculates the displacement value of the photographing position directly to make the error compensation more accurate and efficient.

In an embodiment, the space coordinate system is a Cartesian coordinate system or a cylindrical coordinate system.

In an embodiment, a unit of the displacement value is length or angle.

In an embodiment, the azimuth is 90 degrees.

In an embodiment, the error compensation method further comprises: arranging the object on a mechanical arm.

In an embodiment, a material of the object is invar, super invar or zero thermal expansion glass-ceramics.

In an embodiment, the displacement value of the first surface and the second surface is calculated by Sum of Absolute Differences (SAD), Sum of Squared Differences (SSD), Speeded Up Robust Features (SURF), Scale Invariant Feature Transform (SIFT) or Normalized Cross Correlation (NCC).

In an embodiment, the number of the photographing module is two, and two of the photographing modules are arranged on both sides of the object.

DETAILED DESCRIPTION OF THE PREFERRED EMBODIMENTS

To make it easier for the examiner to understand the objects, characteristics and effects of this present disclosure, embodiments together with the attached drawings for the detailed description of the present disclosure are provided.

Figure 1:
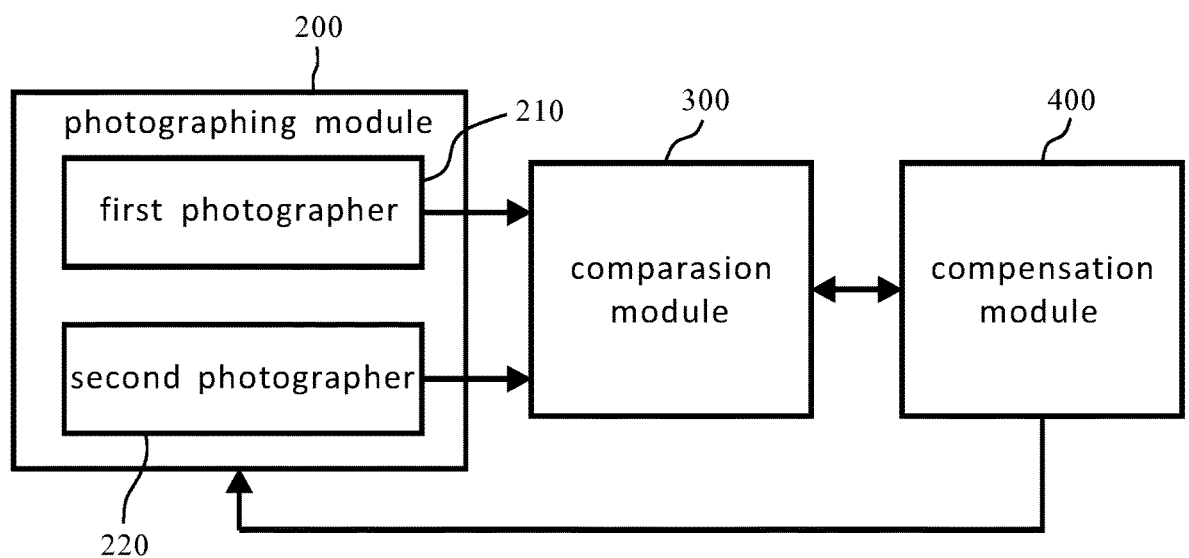
FIG. 1 is a block diagram of an error compensation device according to an embodiment of the present disclosure.
Figure 2A:
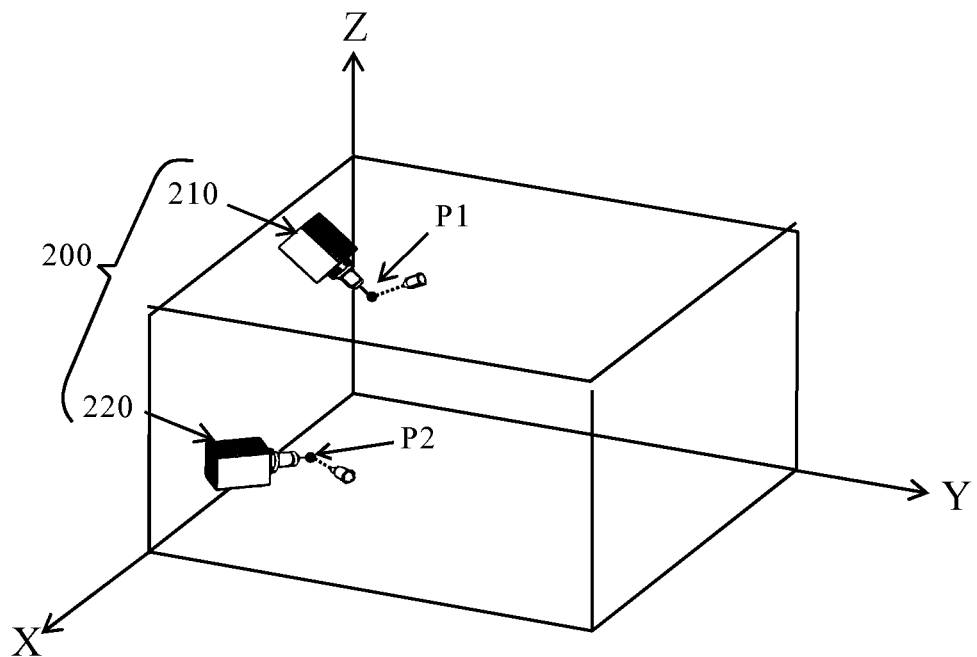
FIG. 2A is a schematic diagram of a photographing module of the error compensation device of FIG. 1 in a Cartesian coordinate system.
Figure 2B:
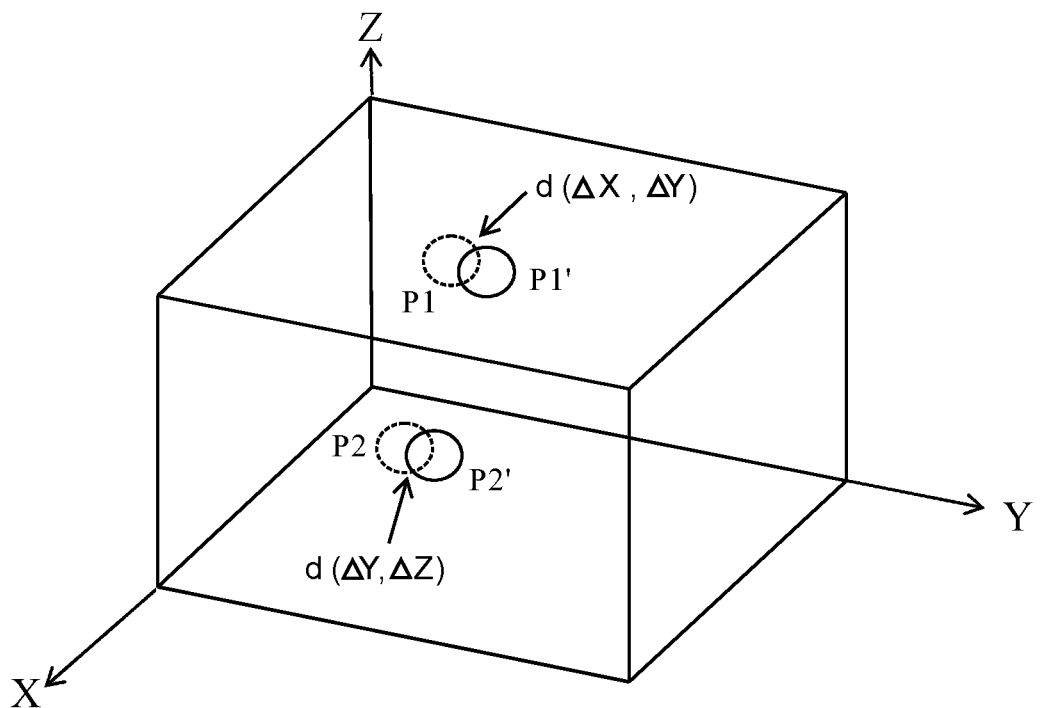
FIG. 2B is a schematic diagram of non-deformed laser speckle image displacements of the error compensation device of FIG. 2A.
Figure 4:
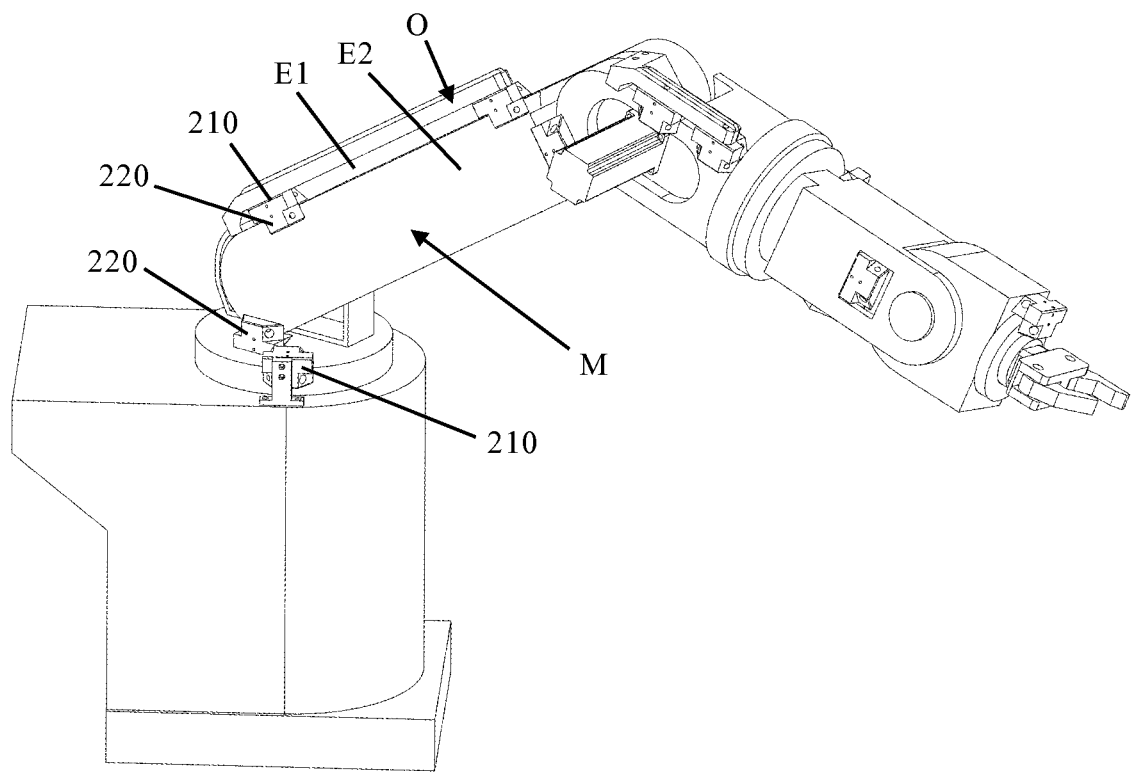
FIG. 4 is a schematic diagram of the error compensation device of FIG. 1 applied to a mechanical arm.

Please refer to FIG. 1, FIG. 2A and FIG. 2B. An embodiment of the present disclosure provides an error compensation device 100 for detecting and compensating a displacement error of an object O. The error compensation device 100 comprises at least one photographing module 200, a comparison module 300 and a compensation module 400. The photographing module 200 establishes a space coordinate system relative to the object O and comprises a first photographer 210 and a second photographer 220. As shown in FIG. 2A and FIG. 2B, the first photographer 210 corresponds to a first surface E1 (as shown in FIG. 4) of the object O for photographing a plurality of first non-deformed laser speckle images P1 and P1' on the first surface E1. More precisely, when the object O moved, a position of the first surface E1 corresponding to the first photographer 210 will change, the first non-deformed laser speckle image P1 captured by the first photographer 210 will also change its position to the first non-deformed laser speckle image P1'. Therefore, the plurality of first non-deformed laser speckle images P1 and P1' means: a collection of images taken by the first photographer 210 at various locations on the first surface E1 when the object O moved. Similarly, the second photographer 220 corresponds to a second surface E2 (as shown in FIG. 4) of the object O for photographing a plurality of second non-deformed laser speckle images P2 and P2' on the second surface E2, wherein the first surface E1 and the second surface E2 differ from the object O by an azimuth. When the first surface E1 and the second surface E2 are displaced, the comparison module 300 respectively compares two of the first non-deformed laser speckle images P1 and P1' and two of the second non-deformed laser speckle images P2 and P2' before and after the displacement of the object O, thereby calculating displacement values d of the first surface E1 and the second surface E2 in the space coordinate system.

In the present embodiment, the non-deformed laser speckle image is generated by using coherent light source illuminates the surface of the object O and capturing the light scattering from the texture of the surface the object O. Under microscopic conditions, the texture captured at any two points on the surface of the object O cannot be exactly the same. Therefore, by taking the texture images at different position of the first surface E1 and the second surface E2 in advance and building each images and position into a database, it can be applied to subsequent error compensation work. For example, the first photographer 210 captures two positions of the first surface E1 before and after the object displaces, the comparison module 300 compares two first non-deformed laser speckle images P1 and P1' with the database, the positions of the first non-deformed laser speckle image P1 and P1' on the first surface E1 can be quickly found and the displacement value d of the first surface E1 can be calculated.

The displacement value d described in the present embodiment can be calculated by a combination of Sum of Absolute Differences (SAD), Sum of Squared Differences (SSD), Speeded Up Robust Features (SURF), Scale Invariant Feature Transform (SIFT), or Normalized Cross Correlation (NCC), but not limited thereto.

After obtaining the positions of the non-deformed laser speckle images before and after the object O displaces by using the above method, the compensation module 400 receives the displacement values d for error compensation. More specifically, the entire error compensation work uses forward kinematics and inverse kinematics to iteratively correct errors, wherein the forward kinematics refers to calculate the last position of any point on the surface of the object O based on the amount of movement, rotation or other factors caused by displacement of the object, and the inverse kinematics is to determine the movement of the object based on the surface of the object at any point on the current position and the next target position. In the present embodiment, the compensation module 400 is coupled to the object O. When an error exists, the compensation module 400 calculates movement parameters (such as the linear movement amount and the rotation amount) for correcting the displacement values d, wherein the movement parameters are calculated by inverse kinematics using the displacement values d, and then the object O is moved to the target position. When the first surface E1 or the second surface E2 reaches a new position, the comparison module 300 compares the difference between the new position and the target position, and uses the forward kinematics to adjust the movement parameters, and compares the displacement values d of the non-deformed laser speckle images of the new position and the target position again, so that the compensation module 400 continue to compensate for the error.

Figure 3A:
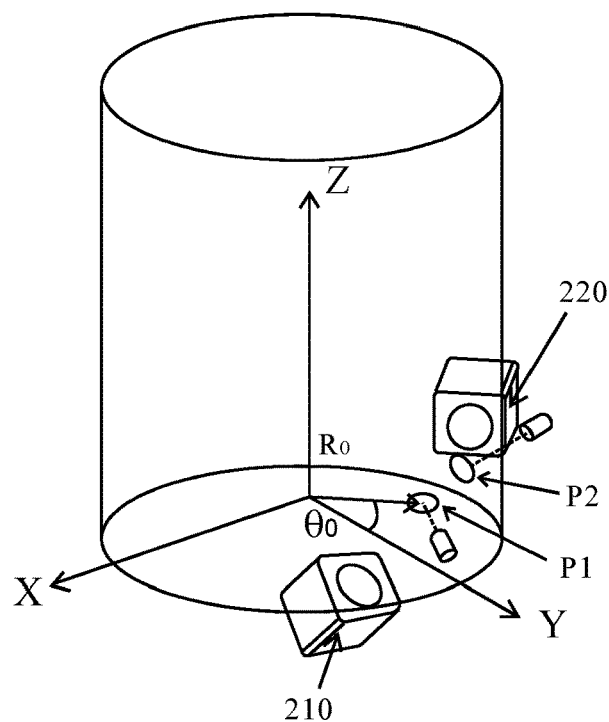
FIG. 3A is a schematic diagram of the photographing module of the error compensation device of FIG. 1 in a cylindrical coordinate system.
Figure 3B:
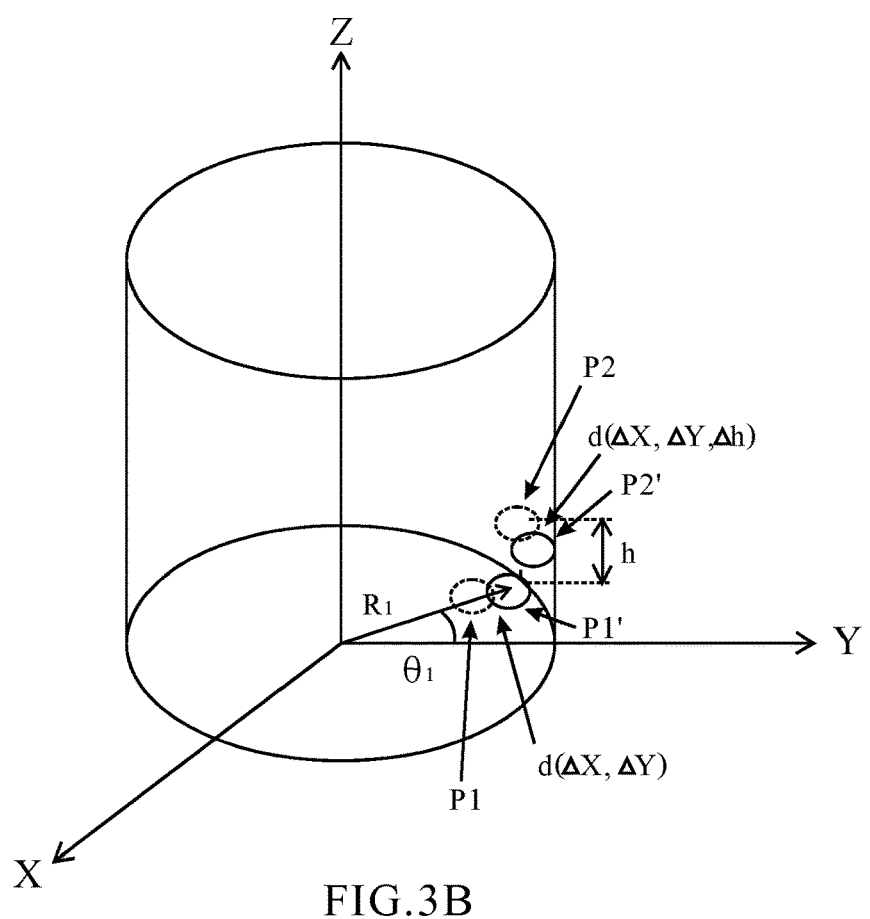
FIG. 3B is a schematic diagram of non-deformed laser speckle image displacements of the error compensation device of FIG. 3A.

Please refer to FIG. 3A and FIG. 3B, in other embodiments, the applicable object O of the photographing module 200 is not limited to a flat surface, for example, the object O can be a cylinder or other irregular shape, and the space coordinate system can be Cartesian coordinate ($\Delta X$、$\Delta Y$、$\Delta Z$), cylindrical coordinate system ($\Delta r$、$\Delta \theta$、$\Delta h$) or other coordinate system. Similarly, the unit of the displacement value d is not limited to a length but may be an angle.

As shown in FIG. 2B and FIG. 3B, the difference of azimuth between the first surface E1 and the second surface E2 is 90 degrees. Take FIG. 2B as an example, due to the limitation of shooting direction, it is not easy for the first photographer 210 to photograph the displacement value d of the first non-deformed laser speckle image in Z direction, and for the second photographer 220, it is hard to photograph the displacement value d of the second non-deformed laser speckle image in X direction. Therefore, with the azimuth difference between the first surface E1 and the second surface E2, the present embodiment can obtain the displacement values d of the object from different directions. Please note that the 90 degrees of the azimuth is only for finding the displacement values d of axes in the coordinate system conveniently. In the case of the irregular surface of the object O (for example, the object O is the mechanical arm M or arranged on the mechanical arm M), the azimuth is likely to be greater or less than 90 degrees. However, the difference of the azimuth does not affect the calculation of the displacement values d.

Refer to FIG. 4, which is a schematic diagram of application of the error compensation device 100 in this embodiment to the mechanical arm M. The error compensation device 100 also includes two or more photographing modules 200, and the positions of two of the photographing modules 200 respectively correspond to two sides of the object O. As shown in FIG. 4, since the mechanical arm M has a longer length, the weight of the mechanical arm M itself can cause non-geometric errors in the end, by arranging the photographing module 200 on both sides of the object O, the displacement values d of the first surface E1 and the second surface E2 can be more accurately detected. In addition, the error compensation device 100 may be disposed on the object O of an unloading frame, besides being directly disposed on the mechanical arm M. In order to avoid the unexpected deformation of the object O itself, the object O may be made of invar, super invar or zero thermal expansion glass-ceramics.

FIG. 4 illustrates the mechanical arm M with a multi-section link, the photographing module 200 can be disposed on the object O or the mechanical arm M, and the error compensation device 100 includes multiple photographing modules 200. By using the mechanical arm M as a reference point, the displacement values d of each photographing module 200 are used to correct the position of the next photographing module 200. Therefore, the comparison module 300 can corrects the displacement values d of each photographing module 200 so as to obtain the position errors of each photographing module 200 on the mechanical arm M. The comparison module 300 further corrects and compensates each part of the mechanical arm M one by one until the actuator at the end of the mechanical arm M.

As describe above, the present embodiment can be applied to error compensation of mechanical arm M or other automatic equipment. Moreover, since the present embodiment measures and compensates the final result of the error, it is not necessary to separately consider various error factors and the correction method, not only the compensation result is more accurate, but also the difficulty of error compensation is reduced.

Figure 5:
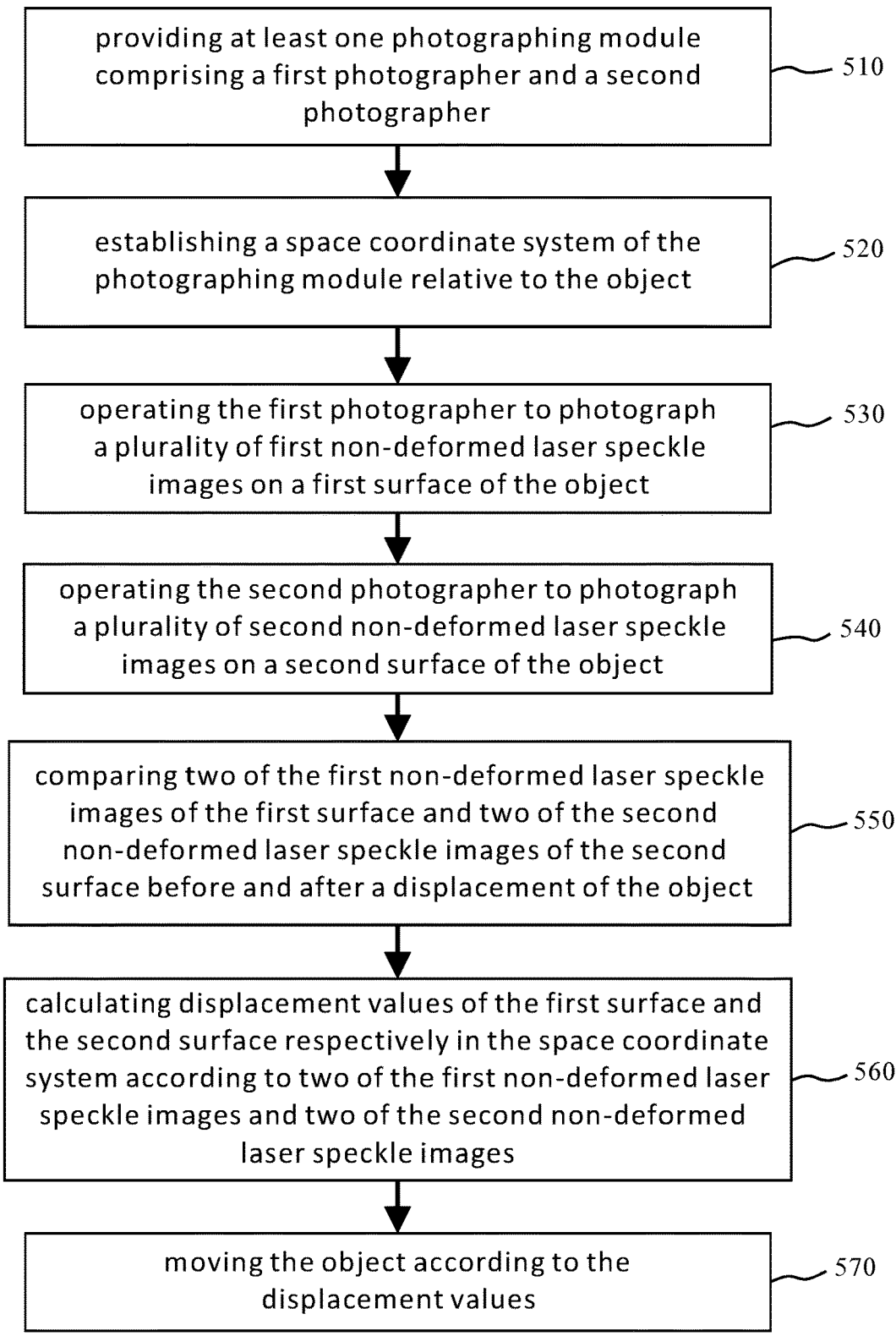
FIG. 5 is a flow chart of an error compensation method of an embodiment of the present disclosure.

Refer to FIG. 5, according to another embodiment of the present disclosure, an error compensation method 500 is provided, which includes the following steps: at step 510, providing at least one photographing module 200, which includes a first photographer 210 and a second photographer 220; at step 520, establishing a space coordinate system of photographing module 200 relative to object O; at step 530, operating the first photographer 210 to photograph the plurality of first non-deformed laser speckle image P1 and P1' on the first surface E1 of the object O; at step 540, operating the second photographer 220 to photograph the plurality of second non-deformed laser speckle images P2 and P2' on the second surface E2 of the object O, wherein the first surface E1 and the second surface E2 are different from the object O by the azimuth; at step 550, comparing the two of the first non-deformed laser speckle images P1 and P1' of the first surface E1 and two of the second non-deformed laser speckle images P2 and P2' of the second surface E2 before and after the displacement of the object O; at step 560, calculating the displacement values d of the first surface E1 and the second surface E2 in the space coordinate system according to the first non-deformed laser speckle image P1 and P1' and the second non-deformed laser speckle images P2 and P2'; at step 570, controlling the movement of the object O according to the displacement values d.

The detailed implementation of the error compensation method 500 of the error compensation method is the same as that of the error compensation device 100 described above, and therefore will not be described in detail here. The present embodiment directly measured final displacement result at an arbitrary position on the object O and corrected accordingly. Compared with the prior art, for example, the method of establishing various thermal error models and force analysis models and correcting and compensating one by one, the error compensation method 500 has faster and more accurate results. At the same time, it can correct the displacement at any position without considering the backlash error of the components during assembly or the size error of the components, which can make the correction compensation simpler.

In an embodiment, the space coordinate system of the error compensation method 500 is a Cartesian coordinate system or a cylindrical coordinate system.

In an embodiment, the unit of the displacement value d of the error compensation method 500 is length or angle.

In an embodiment, the azimuth of the error compensation method 500 is 90 degrees.

In an embodiment, the object O of the error compensation method 500 is arranged on a mechanical arm.

In an embodiment, the object O of the error compensation method 500 is made of invar, invar or zero thermal expansion glass-ceramics.

In an embodiment, the displacement values d of the first surface E1 and the second surface E2 of the error compensation method 500 are calculated by Sum of Absolute Differences (SAD), Sum of Sum of Absolute Squares of Squared Differences (SSD), Speeded Up Robust Features (SURF), Scale Invariant Feature Transform (SIFT) or Normalized Cross Correlation (NCC).

In an embodiment, the number of the photographing module 200 of the error compensation method 500 may be two, and two photographing module 200 respectively correspond in position to two sides of the object O.

While the present disclosure has been described by means of specific embodiments, numerous modifications and variations could be made thereto by those skilled in the art without departing from the scope and spirit of the present disclosure set forth in the claims.

What is claimed is:

1. An error compensation method for detecting and compensating a displacement error of an object, the error compensation method comprising:
    providing at least one photographing module comprising a first photographer and a second photographer;
    establishing a space coordinate system of the at least one photographing module relative to the object;
    operating the first photographer to photograph a plurality of first non-deformed laser speckle images of a first surface of the object;
    operating the second photographer to photograph a plurality of second non-deformed laser speckle images of a second surface of the object, wherein the first surface of the object and the second surface of the object differ by an azimuth;
    comparing a first non-deformed laser speckle image of the plurality of first nondeformed laser speckle images photographed before displacement of the first surface of the object to a first non-deformed laser speckle image of the plurality of first non-deformed laser speckle images photographed after displacement of the first surface of the object to calculate a first displacement value in the space coordinate system for the first surface;
    comparing a second non-deformed laser speckle image of the plurality of second nondeformed laser speckle images photographed before displacement of the second surface of the object to a second non-deformed laser speckle image of the plurality of second non-deformed laser speckle images photographed after displacement of the second surface of the object to calculate a second displacement value in the space coordinate system for the second surface; and
    moving the object according to the first displacement value and the second displacement value.

2. The error compensation method according to claim 1, wherein the space coordinate system is a Cartesian coordinate system or a cylindrical coordinate system.

3. The error compensation method according to claim 1, wherein a unit of the first displacement value is length or angle and a unit of the second displacement value is length or angle.

4. The error compensation method according to claim 1, wherein the azimuth is 90 degrees.

5. The error compensation method according to claim 1, wherein the object is arranged on a mechanical arm.

6. The error compensation method according to claim 1, wherein a material of the object is invar, super invar or zero thermal expansion glass-ceramics.

7. The error compensation method according to claim 1, wherein the first displacement value and the second displacement value are calculated by a combination of Sum of Absolute Differences (SAD), Sum of Squared Differences (SSD), Speeded Up Robust Features (SURF), Scale Invariant Feature Transform (SIFT) or Normalized Cross Correlation (NCC).

8. The error compensation method according to claim 1, wherein a number of the photographing module is two, and two of the photographing modules are arranged on both sides of the object.

\* \* \* \* \*